United States Patent
Foligno

(10) Patent No.: US 12,131,208 B2
(45) Date of Patent: Oct. 29, 2024

(54) METHOD FOR PROVIDING CONTENT ASSOCIATED WITH A DIGITAL WATERMARK ON A MOBILE TELECOMMUNICATION DEVICE

(71) Applicant: Dr. Ing. h.c. F. Porsche Aktiengesellschaft, Stuttgart (DE)

(72) Inventor: Mark Foligno, Berlin (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 30 days.

(21) Appl. No.: 18/142,159

(22) Filed: May 2, 2023

(65) Prior Publication Data

US 2023/0394271 A1    Dec. 7, 2023

(30) Foreign Application Priority Data

Jun. 3, 2022 (DE) ............ 10 2022 114 114.4

(51) Int. Cl.
*G06K 19/07* (2006.01)
*G06K 19/06* (2006.01)
*H04B 1/3888* (2015.01)

(52) U.S. Cl.
CPC ... *G06K 19/0723* (2013.01); *G06K 19/06037* (2013.01); *H04B 1/3888* (2013.01)

(58) Field of Classification Search
None
See application file for complete search history.

(56) References Cited

U.S. PATENT DOCUMENTS

| 11,348,152 | B1 | 5/2022 | Davis |
| 2014/0187201 | A1* | 7/2014 | Saatchi ............ H04M 1/026 455/411 |
| 2022/0156339 | A1 | 5/2022 | Grajales |

FOREIGN PATENT DOCUMENTS

| DE | 102020101579 A1 | 7/2021 | |
| WO | WO-2015006933 A1 * | 1/2015 | ....... H04N 21/42203 |

* cited by examiner

*Primary Examiner* — Kristy A Haupt
(74) *Attorney, Agent, or Firm* — Buchanan Ingersoll & Rooney PC

(57) ABSTRACT

A method for providing content associated with a digital watermark on a mobile telecommunication device. The method includes coupling the mobile telecommunication device with a radio module integrated into an accessory mountable to the mobile telecommunication device and associated with the digital watermark. The digital watermark is a cryptographically unique and indivisible digital watermark. The method includes reading the digital watermark from the accessory and providing content associated with the digital watermark on the mobile telecommunication device. Further provided is an accessory for a mobile telecommunication device, which accessory includes a radio module associated with a digital watermark.

10 Claims, No Drawings

METHOD FOR PROVIDING CONTENT ASSOCIATED WITH A DIGITAL WATERMARK ON A MOBILE TELECOMMUNICATION DEVICE

CROSS-REFERENCE TO RELATED APPLICATION

This application claims priority to German Patent Application No. 10 2022 114 114.4, filed Jun. 3, 2022, the content of such application being incorporated by reference herein in its entirety.

FIELD OF THE INVENTION

The present invention relates to a method for providing content associated with a digital watermark on a mobile telecommunication device, wherein the digital watermark is associated with a radio module integrated into an accessory, preferably a protective cover for the mobile telecommunication device.

BACKGROUND OF THE INVENTION

In principle, there are a variety of ways of transmitting and delivering content externally to a user's mobile telecommunication device. Typically, the user can do this themselves by loading desired material, e.g., images, movies, or a game, onto their mobile telecommunication device via a suitable mobile application from the internet. Another option is for a user's mobile telecommunication device to be prompted by photographing a QR code or by proximity to an NFC tag embedded in, e.g., a gift card or garment label—provided that the user consents to obtaining data from the internet. By means of a QR code or an NFC tag, similar everyday objects can thus be provided with electronic information.

US 2014/187201 A1, which is incorporated by reference herein, describes an option for integrating digital content into a physical accessory in the form of a protective cover for a smartphone, thereby becoming a means by which the digital content can be delivered to a user of a mobile device. For this purpose, the protective cover comprises an NFC module for communicating with the smartphone and is configured to activate specific functions during a state when coupled with the smartphone.

SUMMARY OF THE INVENTION

Described herein is a method by means of which predetermined content can be provided on a mobile telecommunication device induced by an accessory.

According to one aspect a method for providing content associated with a digital watermark on a mobile telecommunication device includes the steps of:
coupling the mobile telecommunication device with a radio module integrated into an accessory mountable to the mobile telecommunication device and associated with the digital watermark, wherein the digital watermark is a cryptographically unique and indivisible digital watermark;
reading the digital watermark from the accessory;
providing content associated with the digital watermark on the mobile telecommunication device

DETAILED DESCRIPTION OF THE INVENTION

The present invention relates to a method for providing content associated with a digital watermark on a mobile telecommunication device. In this context, the method comprises first coupling the mobile telecommunication having with a radio module integrated into an accessory, which is attachable to the mobile telecommunication device and is associated with the digital watermark, wherein the digital watermark is a cryptographically unique and indivisible digital watermark. The digital watermark can in particular be a digital certificate of authenticity in the form of a token, which is secured using a block chain (decentralized data chain), which is referred to as an NFT (non-fungible token). The digital watermark can be stored fixedly in the memory means of the radio module, wherein the memory can be a read-only memory. The accessory can thus be fixedly coupled with the digital watermark. The coupling process between the accessory and the mobile telecommunication device can comprise an authentication step, during which the accessory is first detected and the user shares the accessory, e.g., via a password input or biometric input, in order to allow connection with the mobile telecommunication device.

The radio module can be a near field communication module, e.g., an NFC or an RFID radio module. For example, the radio module can be a transponder or a radio label, e.g., a passive NFC or RFID tag.

In a further step, the method according to aspects of the invention can comprise reading the digital watermark from the accessory. In this step, the mobile telecommunication device obtains access to the digital watermark stored in the radio module of the accessory.

In a further step, the method according to aspects of the invention can comprise providing content associated with the digital watermark on the mobile telecommunication device. The content provided is content to which the digital watermark refers. The digital watermark is also stored in the associated block chain in a counterfeit-proof manner. The content to be provided can be downloaded from a server having the content stored thereon for displaying or playing on the mobile telecommunication device.

According to further embodiments of the method according to aspects of the invention, said downloading can further comprise downloading the content associated with the digital watermark from an external database. The use of the digital watermark is advantageous in this respect in that it can on the one hand be used as a certificate of authorization in order to gain access to the content associated therewith. On the other hand, by means of protection via the associated block chain, it can be ensured that the content provided on the mobile telecommunication device has not been manipulated in the meantime, but rather corresponds to the originally intended content.

According to further embodiments, as a further step, the method according to aspects of the invention can comprise unlocking the content associated with the digital watermark in an application installed on the mobile telecommunication device. The digital watermark can thus be used as a certificate of authorization, by way of which a specific configuration of an application installed on the mobile telecommunication device or to be installed can be enabled. In this context, the content enabled in the application can be a changed scope of functions or configuration files, as a result of which the operation of the vehicle can be changed/modified accordingly when the mobile telecommunication device or the application is coupled with an electric vehicle. For example, specific functions in the electric vehicle can be enabled, e.g., specific vehicle dynamic modes, changed power limits, and special light configurations.

According to further embodiments of the method according to aspects of the invention, the accessory can be a protective cover for the mobile telecommunication device (a protective cover). By attaching the protective cover to the mobile telecommunication device, the radio module integrated therein comes in sufficient proximity to the range of detection of the corresponding radio module integrated into the mobile telecommunication device. In the case of a mobile telecommunication device, a corresponding NFC or RFID module is meant in this context.

According to further embodiments of the method according to aspects of the invention, the content provided can include acoustic and/or graphical content. For example, the content provided can include audio recordings, e.g., musical works, images, or movies.

The content provided on the mobile telecommunication device can include digital access credentials to events, e.g. concert tickets.

According to further embodiments of the method according to aspects of the invention, said method can also generate a digital wallet (crypto wallet) on the mobile telecommunication device and store the digital watermark in the digital wallet.

According to further embodiments of the method according to aspects of the invention, the content provided on the mobile telecommunication device can include data associated with the digital watermark changing the scope of functions of the mobile telecommunication device. The data can be configuration files that, e.g., alter the appearance of the operating interface of the mobile telecommunication device (e.g., by providing special background images) or make it possible to reach special telephone numbers. In addition, the content can also include individualized ringtones for the mobile telecommunication device.

Further provided according to aspects of the invention is an accessory for a mobile telecommunication device, which accessory is configured to be attached to the mobile telecommunication device, wherein the accessory comprises a radio module, which is associated with a digital watermark. As already described, the radio module can comprise an NFC or an RFID radio module.

In further embodiments of the mobile telecommunication device accessory, the digital watermark can be a cryptographically unique and indivisible digital watermark, in particular an NFT.

What is claimed is:

1. A method for providing content associated with a digital watermark on a mobile telecommunication device, said method comprising:
   coupling the mobile telecommunication device with a radio module integrated into an accessory mountable to the mobile telecommunication device and associated with the digital watermark, wherein the digital watermark is a cryptographically unique and indivisible digital watermark;
   reading the digital watermark from the accessory; and
   providing content associated with the digital watermark on the mobile telecommunication device.

2. The method according to claim 1, further comprising:
   downloading the content associated with the digital watermark from an external database.

3. The method according to claim 1, further comprising:
   unlocking the content associated with the digital watermark in an application installed on the mobile telecommunication device.

4. The method according to claim 1, wherein the accessory is a protective cover for the mobile telecommunication device.

5. The method according to claim 1, wherein the content provided includes acoustic and/or graphical content.

6. The method according to claim 1, said method further comprising:
   generating a digital wallet on the mobile telecommunication device; and
   storing the digital watermark in the digital wallet.

7. The method according to claim 1, wherein the content provided on the mobile telecommunication device includes data altering a range of functions of the mobile telecommunication device.

8. An accessory for a mobile telecommunication device, which accessory is configured to be attached to the mobile telecommunication device, wherein the accessory comprises a radio module associated with a digital watermark.

9. The accessory according to claim 8, wherein the digital watermark is a cryptographically unique and indivisible digital watermark.

10. The accessory according to claim 8, wherein the radio module is an NFC or an RFID radio module.

* * * * *